United States Patent [19]

Haymond

[11] Patent Number: 5,491,589
[45] Date of Patent: Feb. 13, 1996

[54] METER READING APPARATUS

[76] Inventor: David L. Haymond, 2816 McKnipp Dr., Ashland, Ky. 41102

[21] Appl. No.: 883

[22] Filed: Jan. 4, 1993

[51] Int. Cl.$^6$ .............................. G02B 5/00; G02B 7/02; G02B 27/02

[52] U.S. Cl. ..................... 359/895; 359/440; 359/809; 359/819

[58] Field of Search .................... 359/436, 440–442, 359/507–512, 798–812, 894, 895, 809, 900; 428/422; 264/25

[56] References Cited

U.S. PATENT DOCUMENTS

| | | | |
|---|---|---|---|
| 1,515,065 | 11/1924 | Milliken | 359/895 |
| 4,215,916 | 8/1980 | Bell et al. | 359/894 |
| 4,515,437 | 5/1985 | Story | 359/440 |
| 4,594,204 | 6/1986 | Heidenreich et al. | 264/25 |
| 4,643,523 | 2/1987 | Smedley et al. | 359/895 |
| 4,844,595 | 7/1989 | Nealy | 359/895 |
| 5,074,695 | 12/1991 | DeRosa | 359/809 |
| 5,114,792 | 5/1992 | McWilliams et al. | 428/422 |
| 5,210,647 | 5/1993 | Hartnagel et al. | 359/802 |

*Primary Examiner*—Thong Q. Nguyen
*Attorney, Agent, or Firm*—George J. Neilan

[57] ABSTRACT

A cylindrical viewing tube for reading submerged water meters, comprising a clear, high strength polycarbonate viewing tube, a closed bottom end for engaging a submerged meter face, the bottom end being replacable and being threaded onto the viewing tube.

3 Claims, 1 Drawing Sheet

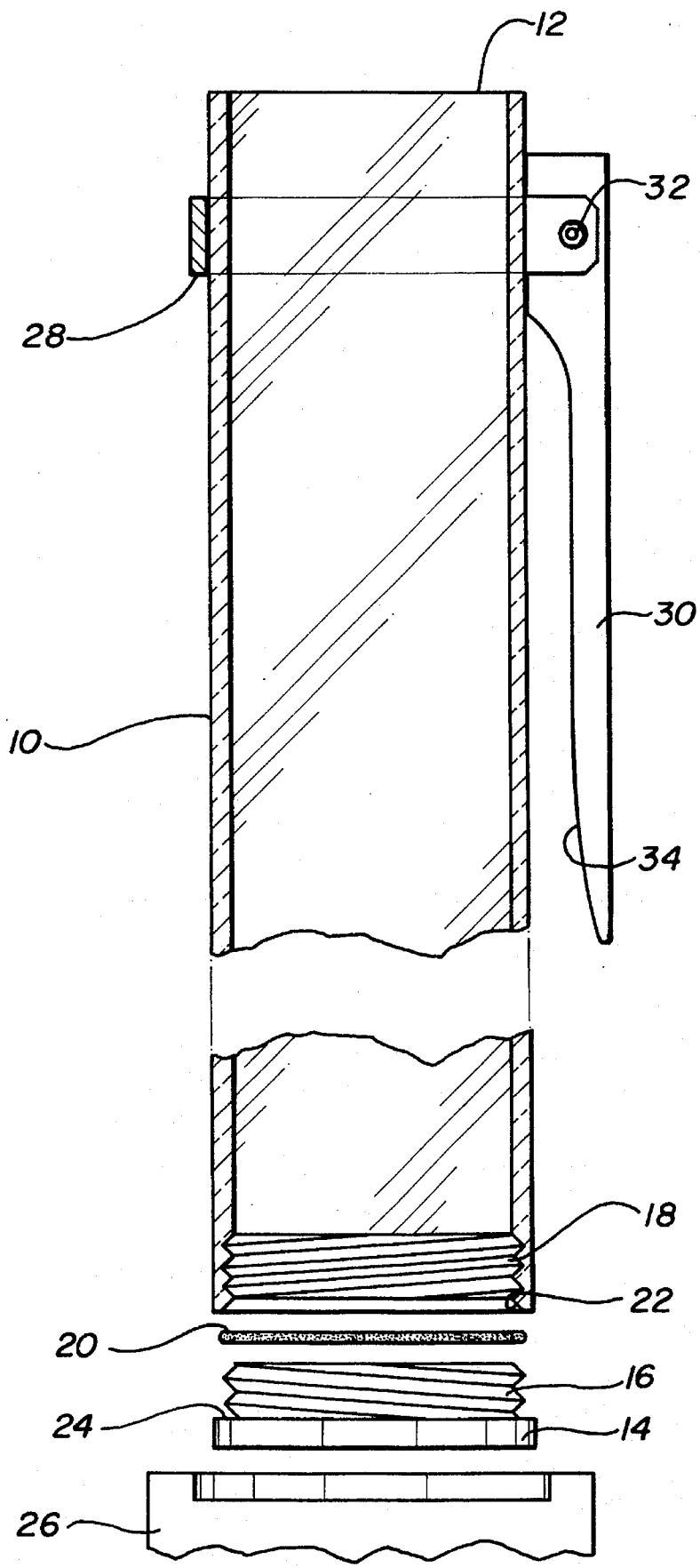

METER READING APPARATUS

FIELD AND BACKGROUND OF THE INVENTION

This invention relates to a viewing tube for reading water meters which may be submerged in water below the surface of the ground.

Water meters are typically installed below ground in meter boxes to prevent freezing. Frequently because of poor drainage etc. water is trapped in the meter box, making it difficult to obtain a correct reading, particularly when the water is muddy. One approach has been to bail water out of the box, a costly and time consumming procedure.

Various viewing devices have been proposed to solve the problem. For example, U.S. Pat. No. 4,215,916 to Bell relates to a meter reading tube that may be compressed to force a jet of water out of the tube to flush the face of the meter.

U.S. Pat. No. 4,515,437 to Story discloses a meter reading tube that includes an internal light assembly.

U.S. Pat. No. 4,884,871 to Creech discloses a viewing tube that has a flexible, transparent closure to conform to the face of the meter.

SUMMARY OF THE INVENTION

Various prior art devices of this type suffer from complexity and/or a lack of durability in use.

It is a primary object of this invention to provide a novel meter viewing tube that is simple in construction and has increased durability.

Another object of the invention is to provide a novel meter viewing tube with a readily replacable bottom end lens closure.

Applicant has found that meter viewing tubes currently in use lack durability and/or the surface of the bottom viewing lens easily becomes so scratched that it is difficult to read numbers through the tube. The present invention proposes to make the viewing tubes out of clear, high strength polycarbonate, which has been found to better withstand the elements than materials currently in use such as polyvinyl chloride tubing. Also, the bottom end lens closure, which is also made of polycarbonate, is threaded onto the tube, and is readily replacable when the lens inevitably becomes too scratched for further use.

BRIEF DESCRIPTION OF THE DRAWING

The sole figure is an exploded view partly in cross-section of the viewing tube of the invention and a typical meter face.

DETAILED DESCRIPTION OF THE INVENTION

Referring to the drawing, the invention comprises a viewing tube 10 made of clear, annealed polycarbonate. Viewing tube 10 has an upper open sight end 12 and a bottom end which is closed and sealed by a rigid polycarbonate lens section 14 that has a circular configuration. The lens section has an integral annular threaded section 16 that mates with internal threads 18 at the bottom end of viewing tube 10. A water tight seal is obtained by using a Buna silicone rubber 0 ring 20 that is seated between a 45 degree machined ring seat 22 at the end of viewing tube 10 and a ring seal shoulder 24 on the inside of lens section 14.

The outside diameter of lens section 14 is slightly smaller than the inside diameter of the face of a meter 26. In use, if the meter 26 in a conventional meter box, not shown, is submerged in water; the viewing tube will be pushed through the water into engagement with the submerged face of meter 26. This displaces the water and enables the meter to be read by looking through the open sight end 12 of the viewing tube 10.

A handle assembly comprises, a tubular band 28 secured around and engaging the outside of viewing tube 10, and a handle portion 30 that is attached to band 28 by a wing nut 32. By loosening the wing nut 32, the position of the handle assembly along the length of viewing tube 10 may be adjusted to suit the user. As shown, the handle portion 30 is spaced from the viewing tube 10 and extends generally parallel thereto to provide an elongated slot 34. Slot 34, in addition to allowing gripping of the handle portion 30, provides spacing so that when not in use the handle portion 30 may be slipped onto the belt of a user. This frees the user to more easily carry a hand-held computer, etc.

It is important to use annealed polycarbonate tubing in constructing the viewing tube 10. Polycarbonate has superior strength and durability compared to various plastics currently used. The annealing of the tube is important in obtaining threads 18 at the bottom end of the tube of sufficient durability. In the absence of annealing, the threads 18 deteriorated, and were not suitable for extended use and for replacement of the lens section 14 after it becomes too scratched for clear viewing of the meter face.

Polycarbonate tubing may be annealed by heating in an oven at about 250 degrees F. for 30 minutes, for ⅛ inch thickness, and then cooling the tube to room temperature before machining to form threads 18.

Silicone rubber was used to make 0 ring 20 because several seal materials were found unsatisfactory and appeared to interact and become attached to the polycarbonate members.

What is claimed is:

1. Apparatus to enable a user to read submerged water meters, comprising; a clear annealed polycarbonate viewing tube, said viewing tube having an upper end and a lower end, said lower end having inner threads; a rigid circular lens section having an integral annular threaded section for detachably engaging with said inner threads of the lower end of said viewing tube, said lens section and said annular threaded section comprising a unitary polycarbonate member; a ring seat at the lower end of said viewing tube; a ring seal shoulder provided on an inside surface of said lens section; and an 0 ring seal disposed around said annular threaded section and between said ring seat and said ring seal shoulder.

2. Apparatus according to claim 1, further comprising a handle assembly attached to said viewing tube, said handle assembly including means to secure said handle assembly to said viewing tube and to enable movement of said handle assembly along said viewing tube, and a handle portion spaced from said viewing tube and generally parallel thereto and having a free end.

3. Apparatus according to claim 1, wherein said upper end of said viewing tube comprises an open sight end.

* * * * *